(12) United States Patent
Klein et al.

(10) Patent No.: US 7,067,563 B2
(45) Date of Patent: Jun. 27, 2006

(54) BINDING AGENTS AND BINDING AGENT COMPOSITIONS CONTAINING ALKOXY SILYL GROUPS, METHODS OF PRODUCTION AND USE

(75) Inventors: Johann Klein, Duesseldorf (DE);
Wilfried Huebner, Langenfeld (DE);
Gaby Schilling, Duesseldorf (DE);
Felicitas Kolenda, Monheim (DE);
Wolfgang Klauck, Meerbusch (DE)

(73) Assignee: Henkel Kommanditgesellschaft auf Aktien, Duesseldorf (DE)

( * ) Notice: Subject to any disclaimer, the term of this patent is extended or adjusted under 35 U.S.C. 154(b) by 80 days.

(21) Appl. No.: 10/332,797

(22) PCT Filed: Jul. 18, 2001

(86) PCT No.: PCT/EP01/08278

§ 371 (c)(1),
(2), (4) Date: Jan. 10, 2003

(87) PCT Pub. No.: WO02/08296

PCT Pub. Date: Jan. 31, 2002

(65) Prior Publication Data

US 2004/0048998 A1 Mar. 11, 2004

(30) Foreign Application Priority Data

Jul. 26, 2000 (DE) .................... 100 36 404

(51) Int. Cl.
*C08J 9/00* (2006.01)
(52) U.S. Cl. .............. 521/154; 521/82; 524/588; 525/100; 525/431; 525/446; 525/464
(58) Field of Classification Search ......... 528/10–43; 526/279; 525/100–106, 431, 446, 464, 474
See application file for complete search history.

(56) References Cited

U.S. PATENT DOCUMENTS

| 3,304,273 | A |   | 2/1967  | Stamberger |          |
|-----------|---|---|---------|------------|----------|
| 3,383,353 | A |   | 5/1968  | Goto       |          |
| 4,208,314 | A |   | 6/1980  | Priest et al. |       |
| 4,456,704 | A | * | 6/1984  | Fukumura et al. | 521/79 |
| 4,567,107 | A |   | 1/1986  | Rizk et al. |         |
| 4,618,653 | A | * | 10/1986 | Kawakubo et al. | 525/404 |
| 4,937,284 | A |   | 6/1990  | Bergstrom  |          |
| 5,554,662 | A |   | 9/1996  | Sanders et al. |      |
| 5,854,358 | A |   | 12/1998 | Heinemann et al. |    |
| 6,051,617 | A | * | 4/2000  | Sasaki et al. | 521/59 |

FOREIGN PATENT DOCUMENTS

| EP | 0 392 567 A2 | 10/1990 |
|----|--------------|---------|
| EP | 0 427 293 A1 | 5/1991  |
| EP | 0 497 231 A2 | 8/1992  |
| EP | 0 861 861 A1 | 9/1998  |
| EP | 0 994 117 A1 | 4/2000  |
| JP | 62-70430 A * | 3/1987  |
| JP | 63-112605    | 5/1988  |
| JP | 04-103606    | 6/1992  |
| JP | 07-331093    | 12/1995 |
| WO | WO 93/05089 A1 | 3/1993 |
| WO | WO 95/16005 A1 | 6/1995 |
| WO | WO 99/24517 A2 | 5/1999 |
| WO | WO 00/04069 A1 | 1/2000 |

OTHER PUBLICATIONS

Derwent Publications Ltd., AN 1996-075145, XP002190732 (JP07331093) (1995).
Abstract for JP 63/112605 A (1988).
Derwent Publications Ltd., AN 1992-178115 (JP04103606) (1992).

* cited by examiner

*Primary Examiner*—Marc S. Zimmer
(74) *Attorney, Agent, or Firm*—Stephen D. Harper; Glenn E. J. Murphy; Daniel S. Ortiz

(57) ABSTRACT

A binder which is a graft polymer bearing at least two alkoxysilyl groups of the formula —$Si(R_1)_m(OR_2)_{3-m}$ in which $R_1$ and $R_2$ are independently linear or branched alkyl groups containing 1 to 6 carbon atoms and m is an integer of 0 to 2. The graft polymer has graft branches on a graft base. The graft polymer contains at least 0.5% by weight, based on the graft base, of graft branches.

15 Claims, No Drawings

BINDING AGENTS AND BINDING AGENT COMPOSITIONS CONTAINING ALKOXY SILYL GROUPS, METHODS OF PRODUCTION AND USE

RELATED APPLICATIONS

This application is filed under 35 U.S.C. 37(c) claiming priority of PCT/EP01/0827 filed Jul. 18, 2001, which claims priority from DE 100 36 404.7 filed Jul. 26, 2000, the contents of each application are incorporated herein by reference.

FIELD OF THE INVENTION

This invention relates to a binder at least containing a graft polymer bearing at least two alkoxysilyl groups corresponding to general formula I:

$$-Si(R_1)_m(OR_2)_{3-m} \qquad (I)$$

in which $R_1$ is a linear or branched alkyl group containing 1 to 6 carbon atoms, $R_2$ is a linear or branched alkyl group containing 1 to 6 carbon atoms and m is an integer of 0 to 2, to a binder composition containing at least one polymer bearing alkoxysilyl groups and at least one other polymer with or without an alkoxysilyl group or a mixture of two or more such polymers, to processes for the production of the binders and to binder compositions and their use.

BACKGROUND OF THE INVENTION

Polymer foams are frequently used for filling cavities with foam or for sealing connecting elements. Polyurethane prepolymers are normally used for the production of such foams. Principal applications are building construction and technical products where cavities have to be filled to avoid condensation traps.

Prepolymers for the production of polyurethane foams have crosslinkable polyisocyanate groups which react with a polyol component or water to form the actual polymer. The foam structure is produced by $CO_2$ formed during the reaction with water or by blowing gas present in the prepolymer mixture or by a combination of both elements.

The isocyanate groups present in the prepolymer mixtures for the production of polyurethane foams are highly reactive and are extremely irritative and toxic towards organisms. Where such mixtures are applied with propellant gases from aerosol cans, there is a risk of aerosol formation, particularly in the event of improper handling so that material containing isocyanate groups can pass onto the skin and into the respiratory tract which is undesirable.

Besides relatively high molecular weight prepolymers, the polyisocyanate-based prepolymer mixtures used in pressurized containers for foam generation generally also contain unreacted polyisocyanates or polyisocyanates which have only reacted off to low molecular weight prepolymers. These constituents of the prepolymer mixtures form the actual danger source because of their relatively high volatility and are therefore undesirable. However, apart from this potential hazard, which proper handling can reduce to a low-risk classification, there is an acceptance problem among many users which is increased by the manufacturer's obligation to declare such products as toxic and by the classification of the empty containers as special waste. This applies in particular to the DIY enthusiast who buys his product in DIY stores.

In the past, various measures have been taken to reduce the toxicity of conventional foamable polyisocyanate-based prepolymer mixtures for aerosol cans, more particularly through the choice of certain polyisocyanates for the preparation of the prepolymers and by reducing the percentage content of monomeric constituents in the prepolymer mixtures. Although, overall, these measures have been successful in regard to the release of isocyanates, the acceptance problem has not been satisfactorily solved because the mixtures in question still contain isocyanates.

Processes for the production of polymer foams substantially free from isocyanate groups are known from the prior art. These polymer foams can be dispensed from aerosol cans or pressurized containers of the conventional type, i.e. without the application technique having to be changed. The handling of such polymer foams largely corresponds to the handling of conventional isocyanate-based polymer foams.

Thus, WO-A 00/04069 describes a prepolymer mixture containing silane-terminated prepolymers. The prepolymer compound is a silane-terminated polyurethane polymer containing at least two alkoxysilyl groups. Prepolymers such as these are produced by initially preparing polyurethane prepolymers containing isocyanate groups which are then terminally reacted with alkoxysilanes containing at least one isocyanate-reactive group. The content of silane termini in the prepolymer is at least 5% by weight. However, a problem in this regard is that the reduction in the content of alkoxysilyl groups in the described systems is normally accompanied by a deterioration in the material properties of the foam to the extent that the foam is too soft and not sufficiently tear-resistant for many applications.

Corresponding problems arise where compounds containing alkoxysilyl groups are used as binders in surface coating compositions, for example in paints or adhesives.

JP 63-112605 A (Abstract) relates to a resin with good flexibility, solvent resistance and adhesion to organic materials. The resin may be used as a surface coating composition, adhesive, sealant or primer. A corresponding resin is produced by radical polymerization of compounds containing olefinically unsaturated double bonds, for example styrene or methacrylates, and oligomeric compounds capable of radical polymerization which bear a silyl group. The oligomeric compounds have a molecular weight of 200 to 60,000. The compounds formed have a C-C polymer backbone throughout, the oligomers present during the polymerization being inserted as side chains. A graft polymer with radically or ionically grafted side chains is not mentioned in the cited document.

EP-A 0 392 567 also relates to a resin with good flexibility, solvent resistance and adhesion to organic materials. This resin also may be used as a surface coating, adhesive, sealant or primer. The document in question also mentions grafting as one of the many possible methods of producing the described polymers. However, it does not mention graft polymers containing at least 0.5% by weight of graft branches.

EP-A 0 427 293 describes a curable composition containing a polymer with silyl groups, an organic silyl compound with a molecular weight of less than 3,000 and a compound containing silanol groups. The polymers containing silyl groups described in this document include inter alia compounds obtainable by copolymerization of macromonomers with low molecular weight vinyl monomers. However, the cited document does not mention graft polymers containing at least 0.5% by weight of graft branches.

WO 93/05089 describes polyurethane compounds containing silyl groups. It does not mention copolymerization with olefinically unsaturated monomers.

JP 04-103606 (CP 92-178115/22) relates to reactive isobutylene polymers containing Si groups. The polymers contain structural units with Si-containing side chains which were grafted onto the main polymer by hydrosilylation. However, the cited document does not mention graft polymers containing at least 0.5% by weight of graft branches.

Accordingly, the problem addressed by the present invention was to provide binders and binder compositions containing alkoxysilyl groups which, despite a reduced emission of alcohols during curing, would lead to surface coating materials with favorable properties, for example to adhesives with universal adhesive properties, i.e. with adhesion to a broad range of different substrates, or to rigid foams with high ultimate strength. The last point in particular could not be fulfilled using silylated prepolymers with a low content of alkoxysilane groups because, hitherto, such systems only led to flexible, elastic products.

BRIEF DESCRIPTION OF THE INVENTION

The problem stated above has been solved by the binders and binder compositions described in the following.

Accordingly, the present invention relates to a binder at least containing a graft polymer bearing at least two alkoxysilyl groups corresponding to general formula I:

$$-Si(R_1)_m(OR_2)_{3-m} \qquad (I)$$

in which $R_1$ is a linear or branched alkyl group containing 1 to 6 carbon atoms, $R_2$ is a linear or branched alkyl group containing 1 to 6 carbon atoms and m is an integer of 0 to 2, with graft branches initiated by radical or ionic polymerization onto a graft base, the graft polymer containing at least 0.5% by weight, based on the graft base, of graft branches.

DETAILED DESCRIPTION OF THE INVENTION

A "binder" in the context of the present invention is understood to be a polymer or a mixture of two or more polymers which, after a curing reaction, makes a decisive contribution to the strength of a structure formed with such a binder. A polymer termed a "binder" in accordance with the invention has at least one reactive functional group which facilitates a chain extension, crosslinking or "binding" of the binder to a substrate or two or more of these processes. A polymer termed a "binder" in accordance with the invention has a molecular weight of at least 1,000, for example at least about 1,500 or at least about 2,000.

The term "molecular weight" in the context of the invention is understood to apply to the value of the number average molecular weight ($M_n$) where it can be determined by GPC under typical conditions against polystyrene as standard.

A "binder" according to the invention may contain, for example, polymers of only one type which only differ, for example, in molecular weight or in the number of reactive functional groups. However, a "binder" according to the invention may also contain a mixture of two or more polymers which are suitable as binders for the purposes of the invention. Different polymers such as these may differ, for example, in the way in which the monomers are chemically linked to one another or in the nature of the monomer composition.

A "binder composition" in the context of the present invention is understood to be a mixture of a binder and at least one other polymer. A "binder composition" according to the invention may contain, for example, a binder and one other polymer which does not contain any reactive groups in the sense of the above definition.

A binder according to the invention contains at least one graft polymer bearing alkoxysilyl groups. A "graft polymer" in the context of the present invention is understood to be a polymer produced by the process of graft copolymerization. A characteristic of the structure of graft polymers is that they carry relatively long side chains on a main chain. Graft polymers in the context of the present invention may contain identical or different main and side chains. Graft polymers with different main and side chains are often also referred to as graft copolymers. In the interests of simplicity, such polymers are basically referred to as graft polymers. In the present specification.

The main chain of the graft polymers is generally known as the backbone polymer, the graft substrate or the graft base and the side chains as graft branches. Graft polymers suitable for use in accordance with the invention are generally produced by polymerization of monomers—which later form the graft branches—in the presence of the graft base. In this case, the graft base acts as a macroinitiator which initiates a radical or ionic polymerization of the graft branches.

Basically, any polymers on which grafting can be carried out by a radical or ionic mechanism are suitable as the graft base for the purposes of the present invention. According to the invention, polymers already containing at least two reactive functional groups X may be used as the graft base. However, polymers which are only provided with corresponding functional groups X after or during grafting, for example in a polymer-analog reaction, may also be used as the graft base.

Basically, any polymers which can be provided with graft branches in a radical or ionic reaction are suitable as the graft base. Polymers suitable as the graft base are, for example, polyesters, polyethers, polyether esters, polyamides, polyurethanes, polyester urethanes, polyether urethanes, polyetherester urethanes, polyamide urethanes, polyureas, polyamines, polycarbonates, polyacrylates, polymethacrylates, polyvinyl esters or polyolefins. Polymers containing a mixture of two or more of the polymer groups mentioned in the polymer backbone are also suitable.

Polyesters with a molecular weight of about 1,000 to 100,000, for example about 3,000 to about 50,000, are suitable for use as the graft base in accordance with the invention. For example, polyesters formed by reaction of low molecular weight alcohols, more particularly ethylene glycol, diethylene glycol, neopentyl glycol, hexanediol, butanediol, propylene glycol, glycerol or trimethylolpropane, with corresponding, at least difunctional acids may be used. Other suitable polyfunctional alcohols for the production of corresponding polyesters are 1,4-hydroxymethyl cyclohexane, 2-methyl-1,3-propanediol, 1,2,4-butanetriol, triethylene glycol, tetraethylene glycol, polyethylene glycol, dipropylene glycol, polypropylene glycol, dibutylene glycol and polybutylene glycol.

Suitable polyester polyols can be obtained, for example, by polycondensation. Thus, difunctional or trifunctional alcohols or a mixture of two or more thereof can be condensed with dicarboxylic acids or tricarboxylic acids or a mixture of two or more thereof or with reactive derivatives thereof to form polyester polyols. Suitable dicarboxylic acids are, for example, succinic acid and higher homologs thereof containing up to 44 carbon atoms, unsaturated dicarboxylic acids, such as maleic acid or fumaric acid, and aromatic dicarboxylic acids, more particularly the isomeric phthalic acids, such as phthalic acid, isophthalic acid or terephthalic acid. Suitable tricarboxylic acids are, for example, citric acid or trimellitic acid. Polyester polyols of at least one of the dicarboxylic acids mentioned and glycerol, which have a residual content of OH groups, are particularly suitable for the purposes of the invention. Particularly suitable alcohols are hexanediol, ethylene glycol, diethylene glycol or neopentyl glycol or mixtures of two or more thereof. Particularly suitable acids are phthalic acid, isophthalic acid, terephthalic acid or adipic acid or mixtures of two or more thereof.

Other polyols suitable as the polyol component for the production of the polyesters are, for example, diethylene glycol or higher polyethylene glycols with a molecular weight ($M_n$) of about 100 to about 22,000, for example about 200 to about 15,000 or about 0.300 to about 10,000, more particularly about 500 to about 2,000.

Polyesters suitable as the graft base in accordance with the present invention include, in particular, the reaction products of polyfunctional, preferably difunctional alcohols (optionally together with small quantities of trifunctional alcohols) and polyfunctional, preferably difunctional carboxylic acids. Instead of free polycarboxylic acids, the corresponding polycarboxylic anhydrides or corresponding polycarboxylic acid esters with alcohols preferably containing 1 to 8 carbon atoms may also be used (where they exist). The polycarboxylic acids may be aliphatic, cycloaliphatic, aromatic and/or heterocyclic. They may optionally be substituted, for example by alkyl groups, alkenyl groups, ether groups or halogens. Suitable polycarboxylic acids are, for example, succinic acid, adipic acid, suberic acid, azelaic acid, sebacic acid, phthalic acid, isophthalic acid, terephthalic acid, trimellitic acid, phthalic anhydride, tetrahydrophthalic anhydride, hexahydrophthalic anhydride, tetrachlorophthalic anhydride, tetrabromophthalic anhydride, endomethylene tetrahydrophthalic anhydride, glutaric anhydride, maleic acid, maleic anhydride, fumaric acid, dimer fatty acid or trimer fatty acid or mixtures of two or more thereof. Small quantities of monofunctional fatty acids may optionally be present in the reaction mixture.

Corresponding polyesters may contain, for example, terminal carboxyl groups. Polyesters obtainable from lactones, for example ε-caprolactone or hydroxycarboxylic acids, for example ω-hydroxycaproic acid, may also be at least partly used.

Also suitable as the graft base are polyethers, for example polyalkylene glycols, with a molecular weight ($M_n$) of at least about 400 or higher, for example at least about 600 or at least about 1,000. The polyethers may be soluble or insoluble in water.

Such polyethers are generally produced by catalyst-assisted ring-opening polymerization of epoxides or higher cyclic ethers, such as tetrahydrofuran.

The polymerization normally starts out from a so-called starter molecule. Suitable starter molecules are, basically, any compounds which are capable of ring-opening epoxide rings or higher cyclic ethers; optionally in the presence of a suitable catalyst. Examples of such compounds are primary, secondary or tertiary amines, primary, secondary or tertiary alcohols, thiols or carboxylic acids.

The polymerization is generally base-catalyzed. The polyethers used in accordance with the present invention are, for example, polyalkylene glycols obtainable by polymerization of ethylene oxide, optionally in admixture with $C_{3-12}$ alkylene oxides. For example, polyethylene glycols containing $C_3$ or $C_4$ units or both obtainable by copolymerization of ethylene oxide with propylene oxide or butylene oxide or mixtures thereof are suitable for use as the graft base.

Polyethers obtainable by Co—Zn cyanide complex catalysis are also suitable.

In a preferred embodiment of the invention, polyalkylene glycols produced using primary, secondary or tertiary alcohols or mixtures of two or more thereof as starter molecules are used as the graft base.

Basically, suitable starter molecules are any mono- or polyfunctional alcohols or mixtures thereof although a preferred embodiment of the invention is characterized by the use of polyalkylene glycols which have been produced using a dihydric or trihydric alcohol, for example ethylene glycol, propylene glycol, butylene glycol, pentanediol, hexanediol, heptanediol, octanediol and higher homologs thereof, neopentyl glycol, glycerol, trimethylolpropane, triethylolpropane, pentaerythritol, glucose, sorbitol, mannitol or a mixture of two or more thereof as starter molecule.

The polyalkylene glycols suitable for use as the graft base in the process according to the invention generally have a molecular weight ($M_n$) of at least about 500 or at least about 1,000, for example at least about 2,000 or at least about 5,000. The upper molecular weight limit is, for example, about 50,000 and more particularly up to about 30,000.

The polyalkylene glycols may be used individually, i.e. as a polyaddition product with molecular weight distributions as typically formed in base-catalyzed additions of alkylene oxides onto water or other starter molecules. However, mixtures of various polyalkylene glycols with different molecular weight distributions may also be used. Polyalkylene glycols formed by addition of only one alkylene oxide compound onto a starter molecule may also be used. However, it is also possible to use polyalkylene glycols obtainable by addition of various alkylene oxides. These may be both block copolymers and statistical copolymers.

Polyetheresters obtainable by polycondensation of polycarboxylic acids with polyethers are also suitable as the graft base in accordance with the present invention. Basically, the above-mentioned polycarboxylic acids and polyethers are suitable for this purpose.

Polyamides obtainable by polycondensation of polycarboxylic acids with polyamines, more particularly by reaction of dicarboxylic acids with diamines, are also suitable as the graft base. Suitable dicarboxylic acids are, for example, the dicarboxylic acids suitable for the production of polyesters which have already been mentioned in this specification, more particularly the dimer fatty acids.

In addition, polyurethanes with a molecular weight ($M_n$) of at least about 2,000, for example of about 5,000 or higher, may also be used as the graft base for the purposes of the present invention. Both ionic and nonionic, water-soluble or water-insoluble polyurethanes are suitable as the graft base.

Polyurethanes suitable as the graft base for the purposes of the present invention are normally prepared by reaction of at least one polyisocyanate, preferably a diisocyanate, and a polyol component which preferably consists predominantly of diols. The polyol component may contain only one polyol although a mixture of two or more different polyols may also be used as the polyol component. Polyalkylene oxides for example, more particularly polyethylene oxide, are particularly suitable as the polyol component or at least as part of the polyol component.

The term "ionic" means that the polyurethane contains ionic groups or at least groups ionizable in an acid/base reaction as solubilizers, for example carboxylate, sulfonate, phosphonate or ammonium groups.

The term "nonionic" accordingly means that the polyurethane does not contain any ionic groups, i.e. no carboxylate, sulfonate, phosphonate or ammonium groups. Any water solubility present in nonionic polyurethanes is attributable, for example, to the hydrophilic nonionic groups of the polyoxyethylene —[$CH_2$—$CH_2$—O—]$_n$—. These structural units are derived in particular from the polyethylene oxide used as polyol component. However, polyethylene oxide in the present context encompasses not only polyaddition products of ethylene oxide with water or ethylene glycol as starter molecule, but also polyaddition products of ethylene oxide with other dihydric alcohols, for example butanediol, hexanediol or 4,4'-dihydroxydiphenylpropane. Mixtures of two or more different polyethylene oxides differing, for example, in their average molecular weight $M_w$ or $M_n$ or in both may also be used. Copolymers of ethylene oxide with higher alkylene oxides, for example with propylene oxide, may also be used as the polyol component.

The polyethylene oxide in the polyol component may be completely or partly replaced by other diols which contain a hydrophobic moiety with a water solubility of at most 2 g/100 g water. The hydrophobic moiety is in particular an aliphatic or alicyclic structure containing 2 to 44 carbon atoms and more particularly 6 to 36 carbon atoms. The moieties in question may also contain aromatic structures. Diols containing at least one primary OH group, more particularly 1,2- or α,ω-diols, are preferred. However, diols with vicinal OH groups are also suitable.

A polyalkylene oxide in the polyol component preferably has a molecular weight ($M_n$) of about 200 to about 20,000, more particularly of about 1,000 to about 15,000, for example of about 1,550, 3,000, 6,000 or 12,000.

In addition, the polyethylene glycol or parts thereof may be replaced by hydrophobic homopolymeric polyalkylene glycols, the alkylene group containing more than 2, preferably 3 or 4 carbon atoms. Their molecular weights are in particular in the range from 150 to 10,000 g/mole.

Specific examples of the hydrophobic diols containing pure CH residues and ether groups are polypropylene glycol (PPG), polybutylene glycol, polytetrahydrofuran, polybutadienediol, hydroxyl-terminated ethylene/butylene copolymers (for example KRATON LIQUID Polymer L-2203), hydrogenated polybutadienediol and alkanediols containing 4 to 44 carbon atoms. Preferred hydrophobic diols are polypropylene glycol, polytetrahydrofuran with a molecular weight of 150 to 10,000, preferably 200 to 4,500 and more preferably 250 to 1,000, 1,10-decanediol, 1,12-dodecanediol, 1,12-octadecanediol, dimer fatty acid diol, 1,2-octanediol, 1,2-dodecanediol, 1,2-hexadecanediol, 1,2-octadecanediol, 1,2-tetradecanediol, 4,4-isopropylidene dicyclohexanol and isomer mixtures thereof, 4,8-bis(hydroxymethyl)tricyclo[5,2,1,0$^{2.6}$]decanes and isomer mixtures thereof, 1,4:3,6-dianhydro-D-mannitol, 1,4:3,6-dianhydro-D-sorbitol, 1,16-hexadecanediol, bisphenol A and propoxylation or ethoxylation products thereof, more particularly with up to 30 EO units, and finally monofatty acid esters of glycerol with fatty acids containing up to 22 carbon atoms, for example glycerol monoesters of behenic acid, oleic acid, stearic acid, myristic acid. Mixtures of two or more of the hydrophobic diols may of course also be used.

In addition, 0 to 5% and, more particularly 0.2 to 2% of the polyethylene glycols may be replaced by alcohols of relatively high functionality, more particularly by triols, for example by glycerol, trimethylol propane, triethanolamine or ethoxylated or propoxylated variants thereof. Pentaerythritol may also be used. Ethoxylated or propoxylated variants of amines or aminoalcohols, for example starting from ethylenediamine, diethylenetriamine, and higher homologs thereof, for example aminophenol, N-2-aminoethyl piperazine, are also possible.

Other suitable polyol components for the production of corresponding polyurethanes are the polyesterpolyols described earlier in this specification.

Besides the polyols of the polyol component, diisocyanates are key constituents of the polyurethanes suitable as the graft base. Diisocyanates are compounds with the general structure O=C=N—X—N=C=O, where X is an aliphatic, alicyclic or aromatic radical, preferably an aliphatic or alicyclic radical containing 4 to 18 carbon atoms.

Examples of suitable isocyanates are 1,5-naphthylene diisocyanate, 4,4'-diphenylmethane diisocyanate (MDI), hydrogenated MDI ($H_{12}$MDI), xylene diisocyanate (XDI), tetramethyl xylylene diisocyanate (TMXDI), 4,4'-diphenyl dimethylmethane diisocyanate, di- and tetraalkyl diphenylmethane diisocyanate, 4,4'-dibenzyl diisocyanate, 1,3-phenylene diisocyanate, 1,4-phenylene diisocyanate, the isomers of toluene diisocyanate (TDI), 1-methyl-2,4-diisocyanatocyclohexane, 1,6-diisocyanato-2,2,4-trimethyl hexane, 1,6-diisocyanato-2,4,4-trimethyl hexane, 1-isocyanatomethyl-3-isocyanato-1,5,5-trimethyl cyclohexane (IPDI), chlorinated and brominated diisocyanates, phosphorus-containing diisocyanates, 4,4'-diisocyanatophenyl perfluoroethane, tetramethoxy-butane-1,4-diisocyanate, butane-1,4-diisocyanate, hexane-1,6-diisocyanate (HDI), dicyclohexylmethane diisocyanate, cyclohexane-1,4-diisocyanate, ethylene diisocyanate, phthalic acid-bis-isocyanatoethyl ester; diisocyanates containing reactive halogen atoms, such as 1-chloromethylphenyl-2,4-diisocyanate, 1-bromomethylphenyl-2,6-diisocyanate or 3,3-bis-chloromethylether-4,4'-diphenyl diisocyanate. Sulfur-containing polyisocyanates are obtained, for example, by reaction of 2 mol hexamethylene diisocyanate with 1 mol thiodiglycol or dihydroxydihexyl sulfide. Other suitable diisocyanates are, for example, trimethyl hexamethylene diisocyanate, 1,4-diisocyanatobutane, 1,12-diisocyanatododecane and dimer fatty acid diisocyanate. Particularly suitable diisocyanates are tetramethylene, hexamethylene, undecane, dodecamethylene, 2,2,4-trimethylhexane, 1,3-cyclohexane, 1,4-cyclohexane, 1,3- and 1,4-tetramethyl xylene, isophorone, 4,4-dicyclohexanemethane and lysine ester diisocyanate. Tetramethyl xylylene diisocyanate (TMXDI), more particularly the m-TMXDI obtainable from Cyanamid, and TDI are most particularly preferred.

In order further to increase the molecular weight, chain extension, for example, may be carried out in known manner by first preparing prepolymers with excess diisocyanate and then extending them with short-chain aminoalcohols, diols or diamines or with water to increase molecular weight.

To this end, prepolymers are initially prepared with excess diisocyanate and are then extended with short-chain diols or diamines or with water. Specific examples of chain-extending agents include:

saturated and unsaturated glycols, such as ethylene glycol or condensates of ethylene glycol, 1,3-butanediol, 1,4-butanediol, 2-butene-1,4-diol, 2-butine-1,4-diol, 1,2-propanediol, 1,3-propanediol, neopentyl glycol, hexanediol, bis-hydroxymethyl cyclohexane, dioxyethoxyhydroquinone, terephthalic acid-bis-glycol ester, succinic acid di-2-hydroxyethylamide, succinic acid di-N-methyl-(2-hydroxyethyl)-amide, 1,4-di-(2-hydroxymethylmercapto)-2,3,5,6-tetrachlorobenzene, 2-methylene-1,3-propanediol, 2-methyl-1,3-propanediol; 3-pyrrolidino-1,2-2-propanediol, 2-methylene-2,4-pentanediol, 3-alkoxy-1,2-propanediol, 2-ethylhexane-1,3-diol, 2,2-dimethyl-1,3- propanediol, 1,5-pentanediol, 2,5-dimethyl-2,5-hexanediol, 3-phenoxy-1,2-propanediol, 3-benzyloxy-1,2-propanediol, 2,3-dimethyl-2,3-butanediol, 3-(4-methoxyphenoxy)-1,2-propanediol and hydroxymethyl benzyl alcohol;

aliphatic, cycloaliphatic and aromatic diamines, such as ethylenediamine, hexamethylenediamine, 1,4-cyclohexylenediamine, piperazine, N-methyl propylenediamine, diaminodiphenyl sulfone, diaminodiphenyl ether, diaminodiphenyl dimethyl methane, 2,4-diamino-6-phenyl triazine, isophoronediamine, dimer fatty acid diamine, diaminodiphenyl methane or the isomers of phenylenediamine;

carbohydrazides or hydrazides of dicarboxylic acids;

aminoalcohols, such as ethanolamine, propanolamine, butanolamine, N-methyl ethanolamine, N-methyl isopropanolamine, diethanolamine, triethanolamine and higher di- or tri(alkanolamines);

aliphatic, cycloaliphatic, aromatic and heterocyclic mono- and diamino-carboxylic acids, such as glycine, 1- and 2-alanine, 6-aminocaproic acid, 4-aminobutyric acid, the isomeric mono- and diaminobenzoic acids and the isomeric mono- and diaminonaphthoic acids.

However, the polyurethane used as graft base is preferably produced by a single-stage process. In this process, for example, all the starting materials are initially mixed in the presence of an organic solvent at a water content of less than 0.5% by weight. The mixture is heated for about 1 to 30 hours to a temperature of 60 to 200° C., more particularly to a temperature of 80 to 180° C. and preferably to a temperature of 100 to 150° C. The reaction time can be shortened by the presence of catalysts.

Particularly suitable catalysts are tertiary amines, for example triethylamine, 1,4-diazabicyclo[2,2,2]octane (=DABCO), dimethyl benzylamine, bis-dimethylaminoethyl ether and bis-methylaminomethyl phenol. 1-Methyl imidazole, 2-methyl-1-vinyl imidazole, 1-allyl imidazole, 1-phenyl imidazole, 1,2,4,5-tetramethyl imidazole, 1-(3-aminopropyl)-imidazole, pyrimidazole, 4-dimethylaminopyridine, 4-pyrrolidinopyridine, 4-morpholinopyridine, 4-methyl pyridine and dimorpholinodiethyl ether are particularly suitable.

Organotin compounds may also be used as the catalysts. Organotin compounds are understood to be compounds which contain both tin and an organic residue, more particularly compounds which contain one or more Sn—C bonds. Organotin compounds in the broader sense include, for example, salts, such as tin octoate and tin stearate. Tin compounds in the narrower sense include above all compounds of tetravalent tin with the general formula $R_{n+1}SnZ_{3-n}$, where n is a number of 0 to 2, R is an alkyl group or an aryl group and, finally, Z is an oxygen, sulfur or nitrogen compound or a mixture of two or more thereof. R preferably contains at least 4 carbon atoms and, in particular, at least 8 carbon atoms. The upper limit is generally at 12 carbon atoms. Z is preferably an oxygen compound, i.e. an organotin oxide, hydroxide, carboxylate or ester of an inorganic acid. However, Z may also be a sulfur compound, i.e. an organotin sulfide, thiolate or thioacid ester. Among the Sn—S compounds, thioglycolic acid esters above all are of interest, for example compounds containing the following residues:

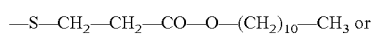

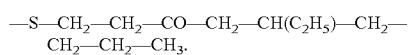

Another preferred class of compounds are the dialkyl tin(IV) carboxylates ($Z=O—CO—R^1$). The carboxylic acids contain 2, preferably at least 10 and more preferably 14 to 32 carbon atoms. Dicarboxylic acids may also be used. Suitable acids are, for example, adipic acid, maleic acid, fumaric acid, terephthalic acid, phenyl acetic acid, benzoic acid, acetic acid, propionic acid and, in particular, caprylic, capric, lauric, myristic, palmitic and stearic acid. Dibutyl tin diacetate and dilaurate and dioctyl tin diacetate and dilaurate, for example, are particularly suitable.

Tin oxides and sulfides and thiolates may also be used in accordance with the invention. Specific compounds are bis-(tributyl tin)oxide, dibutyl tin didodecyl thiolate, dioctyl tin dioctyl thiolate, dibutyl tin bis(thioglycolic acid-2-ethylhexyl ester), octyl tin-tris(thioglycolic acid-2-ethylhexyl ester), dioctyl tin bis(thioethylene glycol-2-ethylhexoate), dibutyl tin bis(thioethylene glycol laurate), dibutyl tin sulfide, dioctyl tin sulfide, bis(tributyl tin)sulfide, dibutyl tin bis(thioglycolic acid-2-ethylhexyl ester), dioctyl tin bis(thioethylene glycol-2-ethylhexoate), trioctyl tin thioethylene glycol-2-ethylhexoate and dioctyl tin bis(thiolatoacetic acid-2-ethylhexyl ester), bis(S,S-methoxycarbonylethyl) tin bis(thiolatoacetic acid-2-ethylhexyl ester), bis(S,S-acetylethyl) tin bis(thiolatoacetic acid-2-ethylhexyl ester), tin(II) octyl thiolate and tin(II) thioethylene glycol-2-ethylhexoate.

Other examples are dibutyl tin diethylate, dihexyl tin dihexylate, dibutyl tin diacetyl acetonate, dibutyl tin diethyl acetyl acetate, bis(butyl dichlorotin)oxide, bis(dibutyl chlorotin)sulfide, tin(II) phenolate, tin(II) acetyl acetonate and other α-dicarbonyl compounds, such as acetyl acetone, dibenzoyl methane, benzoyl acetone, ethyl acetoacetate, n-propyl acetoacetate, ethyl α,α'-diphenyl acetoacetate and dehydroacetic acid.

The catalyst is preferably added to the polyol component. The quantity in which it is used is determined by its activity and by the reaction conditions and is preferably in the range from 0.001 to 0.5% by weight, based on the polyol.

However, the reaction is preferably carried out in the absence of a catalyst. The solvent, too, is also preferably omitted. "Solvents" in the present context are understood to be inert organic liquids with a boiling point below 200° C. at normal pressure.

The reaction is preferably carried out in such a way that the ratio of OH groups in the polyol component to NCO groups in the polyisocyanate is about 1.0 to about 2.2:1, more particularly about 1.5 to 2.0:1, for example about 1.6 to 1.9:1 or about 1.65 to 1.85:1.

Another method of introducing hydrophilic ion-forming structural elements is to react OH-terminated polyurethane oligomers with dicarboxylic anhydrides. These may contain in all 2 to 44 and preferably 2 to 12 carbon atoms between the bis-acyl groups, such as an alkylene, alkenylene or arylene group. Specific examples are succinic anhydride, glutaric anhydride, 1,2,3,6-tetrahydrophthalic anhydride and isomers thereof, phthalic anhydride, trimellitic anhydride, 7-oxabicyclo[2,2,1]hept-5-ene-2,3-dicarboxylic anhydride, 5-norbornene-2,3-dicarboxylic anhydride and isomers thereof, diglycolic anhydride, maleic anhydride, dimethyl maleic anhydride, citraconic anhydride, itaconic anhydride, alkenyl succinic anhydrides, preferably those of which the alkenyl groups contain more than 2 carbon atoms, more preferably more than 5 and, most preferably, more than 7 carbon atoms. Specific examples are n-octenyl succinic anhydride, n-dodecenyl succinic anhydride, tetrapropenyl succinic anhydride, n-hexadecenyl succinic anhydride and n-octadecenyl succinic anhydride. The alkenyl chain may be linear or branched. In addition, mixtures of alkenyl groups with different numbers of carbon atoms may also occur. Mixtures of several anhydrides are also possible, although cyclic anhydrides are preferred.

A molar excess of isocyanates may also be used, in which case NCO-terminated oligomers are formed.

Hydrophobic structural elements may also be obtained by reaction of NCO-terminated oligomers with monools or monofunctional amines containing $\geqq 2$ carbon atoms, more particularly $\geqq 6$, $\geqq 10$ or $\geqq 16$ carbon atoms. Specific examples are polyethylene/butylene containing one OH group, for example with an OH equivalent weight of 3,600 (Kraton L 1203), and 1-hexanol, 1-heptanol, 1-octanol, 1-nonanol, 1-decanol, 1-undecanol, 10-undecen-1-ol, 1-dodecanol, 1-tridecanol, 1-tetradecanol, 1-pentadecanol, 1-hexadecanol, 1-heptadecanol, 1-octadecanol, 9-cis-octadecen-1-ol, 9-trans-octadecen-1-ol, 9-cis-octadecen-1,12-diol, all-cis-9,12,-octadecadien-1-ol, all-cis-9,12,15-octadecatrien-1-ol, 1-nonadecanol, 1-eicosanol, 9-cis-eicosen-1-ol, 5,8,11,14-eicosatetraen-1-ol, 1-heneicosanol, 1-docosanol, 13-cis-docosen-1-ol, 13-trans-docosen-1-ol. The corresponding fatty amines may also be used as hydrophobicizing structural elements.

Finally, another method of introducing hydrophilic ion-forming structures into the polyurethanes suitable as graft base is to react NCO-terminated oligomers with hydroxycarboxylic acids or aminocarboxylic acids containing alkylene, alkenylene or arylene groups, as in the case of the dicarboxylic anhydrides. Examples include glycolic acid, lactic acid, caproic acid and mandelic acid and also aminocaproic acid, aminododecanoic acid, glycine, alanine and phenyl alanine.

Polycarbonates, for example, are also suitable for use as the graft base. Suitable polycarbonates may be obtained by the reaction of diols, such as propylene glycol, butane-1,4-diol or hexane-1,6-diol, diethylene glycol, triethylene glycol or tetraethylene glycol, or mixtures of two or more of these diols with diaryl carbonates, for example diphenyl carbonate, or phosgene.

Polyacrylates or polymethacrylates or copolymers thereof may also be used as the graft base. Polyacrylates and polymethacrylates may be produced, for example, by subjecting acrylic acid and/or methacrylic acid and/or derivatives of acrylic acid and/or methacrylic acid, for example esters thereof with mono- or polyfunctional alcohols, to polymerization, for example radical or ionic polymerization, in known manner either individually or in the form of a mixture of two or more thereof. According to the present invention, polyacrylate or polymethacrylate homopolymers or copolymers which, besides the acrylates, also contain styrene, acrylonitrile, vinyl acetate, vinyl propionate, vinyl chloride, vinylidene chloride and/or butadiene may be used as the graft base.

Monomers suitable for use in the production of the polyacrylates are, in particular, methyl acrylate, ethyl acrylate, n-butyl acrylate, isobutyl acryl ate, tert.butyl acrylate, hexyl acrylate, 2-ethyl hexyl acryl ate or esters of acrylic acid or methacrylic acid with $C_{8-24}$ fatty acids, for example lauryl acrylate up to behenyl acrylate. Acrylic acid, methacrylic acid, acrylamide or methacrylamide may optionally be added in small quantities as further monomers during the polymerization process.

Other acrylates and/or methacrylates containing one or more functional groups may optionally be present during the polymerization. These include, for example, maleic acid, itaconic acid, butanediol diacrylate, hexanediol diacrylate, triethylene glycol diacrylate, tetraethylene glycol diacrylate, neopentyl glycol diacrylate, trimethylolpropane triacrylate, 2-hydroxyethyl acrylate, 2-hydroxyethyl methacrylate, hydroxypropyl acrylate, propylene glycol methacrylate, butanediol monoacrylate, ethyl diglycol acrylate and, as a monomer containing sulfonic acid groups, 2-acrylamido-2-methylpropanesulfonic acid for example. Acrylate/vinyl ester copolymers, acrylate/styrene copolymers or acrylate/methacrylate copolymers are particularly preferred.

Polymers of the esters of unsaturated alcohols with corresponding carboxylic acids (polyvinyl esters) may also be used as the graft base. Suitable unsaturated alcohols are, for example, unsaturated aliphatic alcohols containing 2 to about 22 carbon atoms, more especially 2 to about 8 carbon atoms. Suitable carboxylic acids are linear and branched alkanoic acids containing 2 to about 22 carbon atoms, more especially 2 to about 8 carbon atoms. A preferred embodiment of the invention is characterized by the use of polyvinyl acetate. Suitable polyvinyl acetates are obtainable, for example, under the name of Vinnapas D50 from Wacker, Mowilith D 60 from Clariant or Vinnamul 60 044, Vinnamul 9300, Vinnamul 9960 or Vinnamul 84125 from Vinnamul (NL).

Polyolefins suitable as the graft base in accordance with the present invention are obtainable, for example, by radical or co-ordinative polymerization of α-olefins, more particularly ethylene or propylene. Both homopolymers and copolymers are suitable for the purposes of the invention. If copolymers are to be used as the graft base, it is preferred in accordance with the invention for such polymers to contain at least a percentage of atactic copolymers but preferably to consist largely of atactic copolymers. Processes suitable for the production of corresponding compounds are known to the expert.

The styrene/olefin copolymers obtainable by copolymerization of styrene with mono- or diolefins, more especially butadiene, are also suitable as the graft base for use in the binder according to the invention or in the binder composition according to the invention. The polymers known as synthetic rubber obtainable by copolymerization of styrene and butadiene or styrene and isobutene are particularly suitable in this regard. Synthetic rubbers of the type mentioned which have been subjected to partial or complete hydrogenation are also suitable for the purposes of the invention. Synthetic rubbers suitable for use as the graft base in accordance with the invention preferably have a number average molecular weight of about 5,000 to about 200,000, for example of about 10,000 to about 150,000.

The graft bases described above carry graft branches in accordance with the above definition. Basically, suitable graft bases are any of the polymers already described as the graft base which are capable of reaction with the polymers mentioned as the graft base in a grafting reaction.

However, in a preferred embodiment of the present invention, vinyl chloride, vinylidene chloride, chloroprene, styrene, acrylates, methacrylates, vinyl esters, acrylonitrile or dibutyl maleate are used for grafting the above-mentioned graft bases.

According to the invention, the ratio by weight of graft branches to graft base is such that the grafted polymers, for example grafted polyols, contain at least 0.5% by weight, for example at least about 1% by weight or at least about 2% by weight, preferably at least about 3% by weight or at least about 4% by weight, but especially more than 10% by weight, based on the graft base, of graft branches.

Suitable grafted polyols and their production are described, for example, in U.S. Pat. No. 3,383,353, U.S. Pat. No. 3,304,273, U.S. Pat. No. 5,554,662, EP-A 0 861 861, U.S. Pat. No. 4,208,314 or U.S. Pat. No. 5,854,358.

The graft polymers, for example grafted polyols, used as binders in accordance with the present invention contain at least two alkoxysilyl groups corresponding to general formula I. The alkoxysilyl groups may be positioned, for example, terminally at the ends of the polymer chains of the graft polymer. According to the invention, however, the alkoxysilyl groups may also be positioned elsewhere within the polymer backbone or on one or more graft branches. A combination of these possibilities, i.e. for example an alkoxysilyl group may be positioned at the end of the polymer chain and another alkoxysilyl group may be positioned on the polymer backbone of the graft base or within or at the end of a graft branch, also falls within the scope of the present invention. If the binder according to the invention contains more than two alkoxysilyl groups, for example three, four or five alkoxysilyl groups, the alkoxysilyl groups corresponding to general formula I may be located largely arbitrarily at the ends of the graft base, within the polymer backbone, the graft base or on the graft branches.

Basically, the binders according to the invention may be produced by any methods known to the expert. In a preferred embodiment of the present invention, however, the production of a binder according to the invention is carried out by . . . the graft polymer is obtainable by reaction of a graft polymer containing at least two reactive functional groups X with an alkoxysilane compound corresponding to general formula II:

$$Y\text{---}R_3\text{---}Si(R_1)_m(OR_2)_{3-m} \quad \text{(II)}$$

in which $R_1$ is a linear or branched alkyl group containing 1 to 6 carbon atoms, $R_2$ is a linear or branched alkyl group containing 1 to 6 carbon atoms, $R_3$ is a linear or branched alkyl group containing 2 to 24 carbon atoms, m is an integer of 0 to 2 and Y is a functional group which can react with the functional group X to form a covalent bond or Y and $R^3$ together represent hydrogen, or with a derivative convertible by alcoholysis into an alkoxy compound corresponding to general formula II.

In the context of the invention, a derivative convertible by alcoholysis into an alkoxy compound corresponding to general formula II is understood to be any compound which can be converted by alcoholysis into a compound corresponding to general formula II, for example the compounds which, instead of a residue corresponding to general formula I, contain a residue $Si(Hal)_3$ where Hal is a halogen atom, more particularly chlorine or bromine.

In a preferred embodiment of the present invention, a graft polymer containing at least two functional groups X which is capable of reaction with a corresponding reagent bearing at least one alkoxysilyl group to form a covalent bond is used for the production of the binder according to the invention.

In a preferred embodiment of the invention, the graft polymer contains at least two functional groups X, for example 2, 3, 4, 5 or 6 functional groups X. In special cases, more especially in the case of the polyimines, the number of functional groups X may also exceed that value, for example may be 8, 10, 15 or more.

The functional groups X on the graft polymer may be identical or different. If the number of functional groups is, for example, 3 or more, two of the functional groups X, for example, may be identical while one or more other functional groups X differ from the first functional groups X. Basically, each of the functional groups X on the graft polymer may differ from the other functional groups X on the graft polymer.

Suitable functional groups are, for example, OH, SH, $NH_2$, $NHR_4$, COOH, epoxy, NCO, anhydride or vinyl groups, where $R_4$ is a linear or branched $C_{1-24}$ alkyl group or a $C_{6-24}$ aralkyl group or a $C_{6-24}$ aryl group or an S- or N-containing heteroaryl group.

Corresponding graft polymers can be prepared in known manner from the compounds mentioned above as the graft base or graft branch.

In a preferred embodiment, graft polymers in which the percentage content of functional groups X does not exceed a certain value are used for the production of the binders according to the invention.

If, for example, graft polymers containing OH groups are used, the graft polymers have an OH value of at most about 80 mg KOH/g in a preferred embodiment of the invention. Another preferred embodiment of the present invention is characterized by the use of graft polymers which have an OH value of 50 mg KOH/g or lower, for example about 35 mg KOH/g or lower.

If the graft polymer contains an SH group, NH group, epoxy group, COOH group, anhydride group or $NHR^4$ group as the functional group X, the same applies to the SH, NH, epoxy or COOH value.

In another embodiment of the invention, the concentration of the functional groups X is selected so that the silane content of the binder according to the invention or the binder composition according to the invention is at most about 1.43 mmol silane/g polymer or at most about 0.89 mmol silane/g polymer or at most about 0.63 mmol silane/g polymer.

In another preferred embodiment of the present invention, the percentage content of functional groups X in the graft polymer is selected so that the percentage content of alkoxysilyl groups in the graft polymer containing alkoxysilyl groups is less than about 10% by weight, more particularly less than about 8% by weight or less than about 7% by weight or lower, for example less than about 5% by weight. In a particularly preferred embodiment of the present invention, the percentage content of alkoxysilyl groups in the binder is about 4% by weight or less, for example less than about 3% by weight or less than about 2% by weight.

Examples of commercially obtainable polymers containing OH groups as the functional groups X which may be used in accordance with the invention for the production of the binder containing alkoxysilyl groups are
the Arcol types 1166, HS-100, 1266, 24-32, 31-28, 34-45, XL-1500, E-839, E-840, E-850, 1630 and R 2457 (Lyondell/Bayer);
the Voralux types HN 350, HN 360, HN 370, HN 380, HF 505, HL 106, HL 109, HL 120, HL 108, HL 400 (Dow);
the Specflex types NH 104, NH 123, NH 124, NC 603, NC 604, NC 606, NC 650 and NC 700 (Dow);
the Lupranol types VP 9285, 4190-50 S, 4195-50, 4195-50 S, 4190-65, 4195-65, 4100, 4580-12, 4580-24, 4580-32, 4580-50, 4580-60, 4580-93, 4300, 4500 or 4800 (Elastogran);
the Caradol types SP 41-01, MD 32-02, SP 37-01, SP 32-02, SP 43-03, SP 42-01, SP 38-04, SP 33-03 (Shell).

The binders according to the invention are produced, for example, by reaction of the corresponding graft polymers containing functional groups X with alkoxysilyl compounds which contain at least one functional group Y or a hydrogen atom capable of entering into a covalent bond with the functional group X of the graft polymer.

Suitable functional groups Y are, for example, the functional groups already mentioned as the functional group X, corresponding combinations of X and Y having to be present to the extent that a reaction can take place between X and Y with formation of a covalent bond. If, for example, the functional group X stands for OH, SH, $NH_2$ or $NHR_4$ groups, the functional group Y can stand, for example, for an NCO, epoxy, COOH or anhydride group. However, besides the functional groups already mentioned in the description of the functional group X, Y can also stand for halogen, for example Cl or Br.

In another embodiment of the present invention, Y and $R_3$ in the alkoxysilyl compound of general formula II can together stand for hydrogen. Such compounds can be reacted, for example, with graft bases which contain vinyl groups as the functional groups X. In this case, the formation of the covalent bond between the graft base and the compound of general formula II takes place by the generally known mechanism of hydrosilylation between a C atom of the vinyl group and the Si atom carrying the hydrogen atom in the compound corresponding to general formula II.

According to the invention, an alkoxysilane compound of general formula II usable in accordance with the invention may contain, for example, only one functional group Y. However, it is also within the scope of the present invention for an alkoxysilane compound corresponding to general formula II to contain more than one functional group Y, for example 2 or 3 functional groups Y.

Suitable alkoxysilane compounds corresponding to general formula II are, for example, Cl—$(CH_2)_3$—Si(O—$CH_2$—$CH_3)_3$, Cl—CH($CH_3$)—$CH_2$—Si($OCH_3)_3$, Cl—$(CH_2)_3$—Si(O—$CH_3)_3$, Cl—$CH_2$—$CH_2$—O—$CH_2$—$CH_2$—Si($OCH_3$), OCN—$C_2H_4$—N($CH_3$)—$(CH_2)_3$—Si(O—$CH_3)_3$, OCN—($C_2H_4$—O)$_3$—$C_2H_4$—N($CH_3$)—$(CH_2)_3$—Si(O—$C_4H_9)_3$, Br—$CH_2$—$C_6H_4$—$CH_2$—$CH_2$—Si(O—$CH_3)_3$, Br—$(CH_2)_3$—Si(O—$CH_3)_3$, Cl—CH($C_2H_5$)—$CH_2$—Si($OC_2H_5)_3$, Cl—$(CH_2)_3$—Si(O—$C_2H_5)_3$, Br—$(CH_2)_3$—Si(O—$C_2H_5)_3$, OCN—$(CH_2)_3$—Si(O—$C_2H_5)_3$, Cl—$CH_2$—$CH_2$—O—$CH_2$—Si($OC_2H_5)_3$, (OCN—$C_2H_4)_2$—N—$(CH_2)_3$—Si(O—$C_2H_5)_3$ oder Cl—$CH_2$—$C_6H_4$—$CH_2$—$CH_2$—Si(O—$C_2H_5)_3$, OH—$(CH_2)_3$—Si(O—$CH_2$—$CH_3)_3$, OH—CH($CH_3$)—$CH_2$—Si($OCH_3)_3$, OH—$(CH_2)_3$—Si(O—$CH_3)_3$, OH—$CH_2$—$CH_2$—O—$CH_2$—$CH_2$—Si($OCH_3$), OH—$C_2H_4$—N($CH_3$)—$(CH_2)_3$—Si(O—$CH_3)_3$, OH—($C_2H_4$—O)$_3$—$C_2H_4$—N($CH_3$)—$(CH_2)_3$—Si(O—$C_4H_9)_3$, OH—$CH_2$—$C_6H_4$—$CH_2$—$CH_2$—Si(O—$CH_3)_3$, OH—$(CH_2)_3$—Si(O—$CH_3)_3$, OH—CH($C_2H_5$)—$CH_2$—Si($OC_2H_5)_3$, OH—$(CH_2)_3$—Si(O—$C_2H_5)_3$, OH—$(CH_2)_3$—Si(O—$C_2H_5)_3$, OH—$(CH_2)_3$—Si(O—$C_2H_5)_3$, OH—$CH_2$—$CH_2$—O—$CH_2$—Si($OC_2H_5)_3$, (OH—$C_2H_4)_2$—N—$(CH_2)_3$—Si(O—$C_2H_5)_3$ oder OH—$CH_2$—$C_6H_4$—$CH_2$—$CH_2$—Si(O—$C_2H_5)_3$, $H_2N$—$(CH_2)_3$—Si(O—$CH_2$—$CH_3)_3$, $H_2N$—CH($CH_3$)—$CH_2$—Si($OCH_3)_3$, $H_2N$—$(CH_2)_3$—Si(O—$CH_3)_3$, $H_2N$—$CH_2$—$CH_2$—O—$CH_2$—$CH_2$—Si($OCH_3$), $H_2N$—$C_2H_4$—N($CH_3$)—$(CH_2)_3$—Si(O—$CH_3)_3$, $H_2N$—($C_2H_4$—O)$_3$—$C_2H_4$—N($CH_3$)—$(CH_2)_3$—Si(O—$C_4H_9)_3$, $H_2N$—$CH_2$—$C_6H_4$—$CH_2$—$CH_2$—Si(O—$CH_3)_3$, $H_2N$—$(CH_2)_3$—Si(O—$CH_3)_3$, $H_2N$—CH($C_2H_5$)—$CH_2$—Si($OC_2H_5)_3$, $H_2N$—$(CH_2)_3$—Si(O—$C_2H_5)_3$, $H_2N$—$(CH_2)_3$—Si(O—$C_2H_5)_3$, $H_2N$—$(CH_2)_3$—Si(O—$C_2H_5)_3$, $H_2N$—$CH_2$—$CH_2$—O—$CH_2$—Si($OC_2H_5)_3$, ($H_2N$—$C_2H_4)_2$—N—$(CH_2)_3$—Si(O—$C_2H_5)_3$ or $H_2N$—$CH_2$—$C_6H_4$—$CH_2$—$CH_2$—Si(O—$C_2H_5)_3$ or compounds which contain, for example, a epoxy or anhydride group in the corresponding position, such as (3-triethoxysilylpropyl)succinanhydride.

Also suitable are corresponding alkoxysilane compounds corresponding to general formula II which contain more than one functional group Y. For example, OCN—$CH_2$—CH(NCO)—$(CH_2)_3$—Si(O—$CH_2$—$CH_3)_3$, OCN—CH($CH_2$NCO)—$CH_2$—Si($OCH_3)_3$, Cl—$CH_2$—CH(Cl)—$(CH_2)_3$—Si(O—$CH_2$—$CH_3)_3$, Cl—CH—($CH_2$Cl)—$CH_2$—Si($OCH_3)_3$, Cl—$CH_2$—CH(Cl)—$CH_2$—$CH_2$—O—$CH_2$—$CH_2$—Si($OCH_3$), (Cl—$C_2H_4)_2$N—$(CH_2)_3$—Si(O—$CH_3)_3$, Cl—CH($C_4H_4$Cl)—$CH_2$—Si($OC_2H_5)_3$ or compounds which contain, for example, an OH, $H_2N$, epoxy or anhydride group in the corresponding position.

According to the invention, just one alkoxysilane compound of general formula II, for example, can be present during the reaction with the graft polymer containing at least two functional groups X. However, the reaction may also be carried out with a mixture of two or more alkoxysilane compounds corresponding to general formula II.

The reaction of a graft polymer containing at least two reactive functional groups X with a corresponding alkoxysilane of general formula II or with a mixture of two or more thereof is carried out under conditions generally known to the expert, depending on the functional groups X and Y reacting with one another.

A preferred embodiment of the present invention is characterized by the use of a graft polymer which contains OH groups as the functional groups X. Another preferred embodiment of the present invention is characterized by the use of an alkoxysilane compound of general formula II which contains a halogen atom or an NCO group as the functional group Y.

The binder according to the invention can be produced not just by the procedure described above, but basically in various other ways. In another preferred embodiment of the present invention, the binder according to the invention is produced by reaction of a graft base with a mixture of two or more olefinically unsaturated monomers under radical conditions, at least one of the olefinically unsaturated monomers containing an alkoxysilyl group corresponding to general formula I.

Basically, the graft bases already mentioned above may be used in this process and do not necessarily have to contain a functional group X and, indeed, may even be free from functional groups X for example.

To produce a corresponding binder according to the invention, a graft base such as described above may be reacted with a mixture of at least two olefinically unsaturated monomers under conditions where grafting of the graft base takes place with the mixture of two or more olefinically unsaturated monomers. In this connection, at least one of the olefinically unsaturated monomers has to contain at least one olefinically unsaturated double bond which is incorporated in at least one graft branch under the radical conditions prevailing. In this way, it is possible to produce a binder containing alkoxysilyl groups according to the invention which carries the alkoxysilyl groups in the graft branch.

The content of alkoxysilyl groups in the binder according to the invention may be adjusted in known manner through the concentration of the olefinically unsaturated compound containing alkoxysilyl groups.

Suitable olefinically unsaturated compounds containing alkoxysilyl groups are, for example, $H_2C$=CH—$(CH_2)_3$—Si(O—$CH_2$—$CH_3)_3$, $H_2C$=CH—CH($CH_3$)—$CH_2$—Si($OCH_3)_3$, $H_2C$=CH—$(CH_2)_3$—Si(O—$CH_3)_3$, $H_2C$=CH—$CH_2$—$CH_2$—O—$CH_2$—$CH_2$—Si($OCH_3$), $H_2C$=CH—($C_2H_4$—O)$_3$—$C_2H_4$—N($CH_3$)—$(CH_2)_3$—Si(O—$C_4H_9)_3$, $H_2C$=CH—$CH_2$—$C_6H_4$—$CH_2$—$CH_2$—Si(O—$CH_3)_3$, $H_2C$=CH—$(CH_2)_3$—Si(O—$CH_3)_3$, $H_2C$=CH—CH($C_2H_5$)—$CH_2$—Si($OC_2H_5)_3$, $H_2C$=CH—$(CH_2)_3$—Si(O—$C_2H_5)_3$, $H_2C$=CH—$(CH_2)_3$—Si(O—$C_2H_5)_3$, $H_2C$=CH—$(CH_2)_3$—Si(O—$C_2H_5)_3$, $H_2C$=CH—$CH_2$—$CH_2$—O—$CH_2$—Si($OC_2H_5)_3$, $H_2C$=CH—$CH_2$—

$C_6H_4$—$CH_2$—$CH_2$—Si(O—$C_2H_5$)$_3$, $H_2C$=CH($CH_3$)(—C=O)—O—($CH_2$)$_3$—Si(OCH$_3$), $H_2C$=CH—Si(OCH$_3$) or $H_2C$=CH—Si(OCH$_2$CH$_3$)).

The problems addressed by the invention are solved not just by the binder according to the invention but also by a binder composition according to the invention.

Accordingly, the present invention also relates to a binder composition at least containing a) a polymer bearing alkoxysilyl groups obtainable by a1) reaction of a polymer containing at least two reactive functional groups X with an alkoxysilane compound corresponding to general formula II:

$$Y—R_3—Si(R_1)_m(OR_2)_{3-m} \quad (II)$$

in which $R_1$ is a linear or branched alkyl group containing 1 to 6 carbon atoms, $R_2$ is a linear or branched alkyl group containing 1 to 6 carbon atoms, $R_3$ is a linear or branched alkyl group containing 2 to 24 carbon atoms, an optionally alkyl-substituted cycloalkyl group containing 4 to 24 carbon atoms, an optionally substituted aralkyl group containing 6 to 24 carbon atoms, an alkoxy group containing 2 to 10 carbon atoms, a polyoxyalkylene group containing 4 to 44 carbon atoms or an optionally alkyl-substituted aryl group containing 6 to 24 carbon atoms, m is an integer of 0 to 2 and Y is at least one functional group which can react with the functional group X to form a covalent bond or Y and $R^3$ together represent hydrogen, or by a2) radical or ionic polymerization of a mixture of at least two monomers containing at least one olefinically unsaturated double bond, at least one olefinically unsaturated monomer containing at least one alkoxysilyl group corresponding to general formula I:

$$—Si(R_1)_m(OR_2)_{3-m} \quad (I)$$

in which $R_1$ is a linear or branched alkyl group containing 1 to 6 carbon atoms, $R_2$ is a linear or branched alkyl group containing 1 to 6 carbon atoms and m is an integer of 0 to 2, or a mixture of two or more such polymers, and b) at least one other polymer with or without an alkoxysilyl group which has a softening point of 30 to 250° C. (as measured by the ring and ball method) or a mixture of two or more such polymers.

A binder composition according to the invention contains at least one polymer bearing alkoxysilyl groups as at least one component. A corresponding polymer containing alkoxysilyl groups is obtainable, for example, by reaction of a polymer containing at least two reactive functional groups X with an alkoxysilane compound corresponding to general formula II.

The polymers containing functional groups X already described in this specification are suitable as the polymer containing at least two reactive functional groups X. Particularly suitable corresponding polymers are the polymers already described as the graft base in this specification, more particularly polyesters, polyether esters, polyethers and polyurethanes.

The conditions already mentioned in this specification apply to the functional groups X also.

The graft polymers already described in this specification are also suitable as the polymer containing at least two reactive functional groups X. Corresponding polymers bearing alkoxysilyl groups usable as a constituent of the binder composition according to the invention are obtainable, for example, by reaction of a corresponding polymer containing at least two reactive functional groups X with an alkoxysilane compound corresponding to general formula II.

The alkoxysilane compounds already described in this specification are suitable as the alkoxysilane compound corresponding to general formula II.

Also suitable for use as polymers bearing alkoxysilyl groups in a binder composition according to the invention are the polymers obtainable by radical or ionic polymerization of a mixture of at least two monomers containing at least one olefinically unsaturated double bond, at least one olefinically unsaturated monomer containing at least one alkoxysilyl group corresponding to general formula I.

Suitable monomers containing at least one olefinically unsaturated double bond are the monomers already mentioned in this specification, more particularly in the description of the grafting reaction. Suitable monomers containing at least one olefinically unsaturated double bond and at least one alkoxysilyl group corresponding to general formula I have already been described in this specification.

Besides a polymer bearing alkoxysilyl groups or a mixture of two or more such polymers, a binder composition according to the invention contains at least one other polymer with or without an alkoxysilyl group or a mixture of two or more such polymers.

Suitable other polymers are, for example, polymers based on unsaturated monomers, for example olefins, such as ethylene, propylene, butene, butadiene, cyclopentene, norbornene, dicyclopentadiene or butylene, substituted olefins such as, for example, vinyl chloride, vinylidene chloride, chloroprene or styrene, acrylates and methacrylates, such as butyl acrylate, methyl methacrylate, and vinyl esters such as, for example, vinyl acetate or vinyl butyrate. Acrylonitrile and dibutyl maleate are mentioned as further examples. Co- and terpolymers, block polymers and graft copolymers of the above-mentioned monomers may also be used.

The following are mentioned as examples of such polymers: polyethylene, polypropylene, polyisobutylene, poly-1-butene, poly-4-methyl-1-pentene, polyisoprene, polybutadiene, propylene/1-butene copolymers, propylene/isobutylene copolymers, ethylene/1-butene copolymers, ethylene/hexene copolymers, ethylene/methylpentene copolymers, ethylene/heptene copolymers, ethylene/octene copolymers, propylene/butadiene copolymers, isobutylene/isoprene copolymers, ethylene/vinyl acetate copolymers, ethylene/acrylic acid copolymers, terpolymers of ethylene with propylene and a diene, such as hexadiene, dicyclopentadiene or ethylidene norbornene; polystyrene, poly-(p-methylstyrene), poly-(α-methylstyrene), styrene/butadiene copolymers, styrene/acrylonitrile copolymers, styrene/alkyl methacrylate copolymers, styrene/butadiene/alkyl acrylate and methacrylate terpolymers, styrene/maleic anhydride copolymers, styrene/acrylonitrile/methyl acrylate terpolymers; styrene/butadiene/styrene block copolymers (SBS), styrene/isoprene/styrene block copolymers, styrene/ethylene/butylene/styrene block copolymers or styrene/ethylene/propylene/styrene block copolymers. Graft copolymers of styrene or α-methylstyrene such as, for example, styrene on polybutadiene, styrene on polybutadiene/styrene or polybutadiene/acrylonitrile copolymers, styrene and acrylonitrile (or methacrylonitrile) on polybutadiene; styrene, acrylonitrile and methyl methacrylate on polybutadiene; styrene and maleic anhydride on polybutadiene; styrene, acrylonitrile and maleic anhydride or maleic anhydride on polybutadiene; styrene, acrylonitrile and maleic anhydride or maleic imide on polybutadiene; styrene and maleic imide on polybutadiene, styrene and alkyl acrylates or alkyl methacrylates on polybutadiene, styrene and acrylonitrile on ethylene/propylene/diene terpolymers, styrene and acrylonitrile on polyalkyl acrylates or polyalkyl methacrylates, styrene and acrylonitrile on acrylate/butadiene copolymers. Polychloroprene, chlorinated rubber, chlorinated or chlorosulfonated polyethylene, polyvinyl chloride, polyvinylidene chloride, polyvinyl fluoride, polyvinylidene fluoride; vinyl chloride/vinylidene chloride copolymer, vinyl chloride/vinyl acetate copolymer, vinylidene chloride/vinyl acetate copolymer, polyacrylates and polymethacrylates, polymethyl methacrylates, polyacrylamides and polyacrylonitriles, acrylonitrile/butadiene copolymers, acrylonitrile/alkyl acrylate copolymers, acrylonitrile/alkoxyalkyl acrylate copolymers, acrylonitrile/vinyl halide copolymers, acrylonitrile/alkyl methacrylate/butadiene terpolymers, polyvinyl alcohol with a degree of saponification of up to about 100%, optionally partly saponified polyvinyl acetate, polyvinyl stearate, polyvinyl benzoate, polyvinyl maleate, polyvinyl butyral, polyallyl phthalate, polyallyl melamine.

Mixtures of two or more of the polymers (polymer blends) mentioned may also be used.

The other polymers mentioned preferably have molecular weights of 2,000 g/mol to at most about 10,000,000 g/mol and a softening point of 30° C. to 250° C., preferably 50° C. to 200° C. and more particularly 70° C. to 150° C. (as measured by the ring and ball method).

Polycondensates may also be used as other polymers.

Polycondensates are understood to be polymers which may be obtained by reaction of polycarboxylic acids with polynucleophiles, such as polyamines or polyols, with elimination of water or alcohols. Examples include polyesters such as, for example, polyethylene terephthalate, polybutylene terephthalate, polyethylene naphthylate, poly-1,4-dimethylol cyclohexane terephthalate, polyhydroxybenzoates, polyamides such as, for example, polyamide 4, polyamide 6, polyamide 6/6, 6/10, 6/9, 6/12, 4/6, 12/12, polyamide 11, polyamide 12, poly(2,4,4-trimethylhexamethyleneterephthalamide) or poly-m-phenylene isophthalamide, polycarbonates, polyester carbonates and alkyd resins, more particularly the polycondensates already described in this specification.

The polyurethanes already described in this specification are also suitable for use as other polymers.

A binder composition according to the invention may contain just one polymer bearing alkoxysilyl groups and one other polymer. However, it is also within the scope of the invention for a binder composition according to the invention to contain a mixture of two or more polymers bearing alkoxysilyl groups and at least one other polymer or a mixture of two or more polymers bearing alkoxysilyl groups and a mixture of two or more other polymers or a polymer bearing alkoxysilyl groups and a mixture of two or more other polymers.

In a preferred embodiment of the invention, the binder composition according to the invention contains the polymer bearing alkoxysilyl groups or the mixture of polymers bearing alkoxysilyl groups and the other polymer or the mixture of two or more other polymers in respective proportions which ensure that the percentage content of alkoxysilyl groups in the binder composition according to the invention, based on the mixture of polymers bearing alkoxysilyl groups and other polymers, is at most about 10% by weight but preferably less, for example at most about 9% by weight, 8% by weight, 7% by weight, 6% by weight or at most about 5% by weight. In another preferred embodiment, the percentage content of alkoxysilyl groups is even lower, for example less than 4% by weight, less than 3% by weight or less than 2% by weight.

Basically, the binders according to the invention may be produced by any method known to the expert. In a preferred embodiment of the present invention, however, the binders according to the invention are produced by a single-stage or multistage process involving a graft polymer containing at least two reactive functional groups X.

Accordingly, the present invention also relates to a single-stage or multistage process for the production of a binder according to the invention, characterized in that, in at least one stage, a graft polymer containing at least two reactive functional groups X is reacted with an alkoxysilane compound corresponding to general formula II:

$$Y-R_3-Si(R_1)_m(OR_2)_{3-m} \quad \text{(II)}$$

in which $R_1$ is a linear or branched alkyl group containing 1 to 6 carbon atoms, $R_2$ is a linear or branched alkyl group containing 1 to 6 carbon atoms, $R_3$ is a linear or branched alkyl group containing 2 to 24 carbon atoms, an optionally alkyl-substituted cycloalkyl group containing 4 to 24 carbon atoms, an optionally substituted aralkyl group containing 6 to 24 carbon atoms, an alkoxy group containing 2 to 10 carbon atoms, a polyoxyalkylene group containing 4 to 44 carbon atoms or an optionally alkyl-substituted aryl group containing 6 to 24 carbon atoms, m is an integer of 0 to 2 and Y is at least one functional group which can react with the functional group X to form a covalent bond or Y and $R^3$ together represent hydrogen, to form a covalent bond between X and Y or X and Si.

A binder according to the invention may also be produced without the participation of polymers containing functional groups X.

Accordingly the present invention also relates to a single-stage or multistage process for the production of a binder according to the invention, characterized in that, in at least one stage, a graft base is reacted with a mixture of two or more olefinically unsaturated monomers under radical conditions, at least one of the olefinically unsaturated monomers containing an alkoxysilyl group corresponding to general formula I:

$$-Si(R_1)_m(OR_2)_{3-m} \quad \text{(I)}$$

in which $R_1$ is a linear or branched alkyl group containing 1 to 6 carbon atoms, $R_2$ is a linear or branched alkyl group containing 1 to 6 carbon atoms and m is an integer of 0 to 2.

The present invention also relates to a single-stage or multistage process for the production of a binder composition according to the invention, characterized in that it comprises at least one of the following process stages:

(i) a polymer containing at least two reactive functional groups X is reacted with an alkoxysilane compound corresponding to general formula II:

$$Y-R_3-Si(R_1)_m(OR_2)_{3-m} \quad \text{(II)}$$

in which $R_1$, $R_2$, $R_3$, m and Y are as defined above, to form a covalent bond between X and Y and the reaction product is then mixed with a polymer obtainable by radical polymerization of a monomer containing at least one olefinically unsaturated double bond or a mixture of two or more such monomers or a mixture of two or more such polymers or (ii) a polymer containing at least two reactive functional groups X is mixed with a polymer obtainable by radical polymerization of a monomer containing at least one olefinically unsaturated double bond or a mixture of two or more such monomers or a mixture of two or more such polymers and then with an alkoxysilane compound corresponding to general formula II:

$$Y—R_3—Si(R_1)_m(OR_2)_{3-m} \quad (II)$$

in which $R_1$, $R_2$, $R_3$, m and Y are as defined above, to form a covalent bond between X and Y or (iii) at least one radical polymerization of a monomer containing at least one olefinically unsaturated double bond or a mixture of two or more such monomers to form a polymer is carried out in the presence of at least one polymer containing two reactive functional groups X and the mixture of polymer and polymers is then reacted with an alkoxysilane compound corresponding to general formula II:

$$Y—R_3—Si(R_1)_m(OR_2)_{3-m} \quad (II)$$

in which $R_1$, $R_2$, $R_3$, m and Y are as defined above, to form a covalent bond between X and Y or X and Si or (iv) at least one radical polymerization of a monomer containing at least one olefinically unsaturated double bond or a mixture of two or more such monomers to form a polymer is carried out in the presence of at least one reaction product of a polymer containing at least two reactive functional groups X with an alkoxysilane compound corresponding to general formula II:

$$Y—R_3—Si(R_1)_m(OR_2)_{3-m} \quad (II)$$

in which $R_1$, $R_2$, $R_3$, m and Y are as defined above, to form a covalent bond between X and Y or X and Si.

Besides the constituents mentioned in the foregoing, the binders according to the invention or the binder compositions according to the invention may contain other additives. Suitable additives are, for example, flame retardants, cell regulators, stabilizers, photostabilizers, plasticizers, fillers for adjusting viscosity or other important properties and catalysts. Such additives are generally inert to the reactive groups present in the binder according to the invention.

Suitable plasticizers are, for example, plasticizers based on phthalic acid, more particularly dialkyl phthalates, phthalates esterified with a linear alkanol containing about 6 to about 12 carbon atoms being preferred plasticizers. Dioctyl phthalate is particularly preferred.

Other suitable plasticizers are benzoate plasticizers, for example sucrose benzoate, diethylene glycol dibenzoate and/or diethylene glycol benzoate in which about 50 to about 95% of all the hydroxyl groups have been esterified, phosphate plasticizers, for example t-butylphenyl diphenylphosphate, polyethylene glycols and derivatives thereof, for example diphenylethers of poly(ethylene glycol), liquid resin derivatives, for example the methyl ester of hydrogenated resin, vegetable and animal oils, for example glycerol esters of fatty acids and polymerization products thereof.

The stabilizers or antioxidants suitable for use as additives in accordance with the present invention include sterically hindered phenols of high molecular weight ($M_n$), polyfunctional phenols and sulfur- and phosphorus-containing phenols. Phenols suitable for use as additives in accordance with the invention are, for example, 1,3,5-trimethyl-2,4,6-tris-(3,5-di-tert.butyl-4-hydroxybenzyl)-benzene; pentaerythritol tetrakis-3-(3,5-ditert.butyl-4-hydroxyphenyl)-propionate; n-octadecyl-3,5-ditert.butyl-4-hydroxyphenyl)-propionate; 4,4-methylene-bis-(2,6-di-tert.butylphenol); 4,4-thiobis-(6-tert.butyl-o-cresol); 2,6-di-tert.butylphenol; 6-(4-hydroxyphenoxy)-2,4-bis-(n-octylthio)-1,3,5-triazine; di-n-octadecyl-3,5-di-tert.butyl-4-hydroxybenzyl phosphonates; 2-(n-octylthio)-ethyl-3,5-ditert.butyl-4-hydroxybenzoate; and sorbitol hexa[3-(3,5-ditert.butyl-4-hydroxyphenyl)-propionate].

Suitable photostabilizers are, for example, those commercially obtainable under the name of Tinuvin® (manufacturer: Ciba Geigy).

Other additives may be incorporated in the binder compositions according to the invention in order to vary certain properties. These other additives include, for example, dyes, such as titanium dioxide, fillers, such as talcum, clay and the like. The binder compositions according to the invention may optionally contain small quantities of thermoplastic polymers or copolymers, for example ethylene/vinyl acetate (EVA), ethylene/acrylic acid, ethylene/methacrylate and ethylene/n-butyl acrylate copolymers which optionally impart additional flexibility, toughness and strength to the binder composition. Certain hydrophilic polymers may also be added, including for example polyvinyl alcohol, hydroxyethyl cellulose, hydroxypropyl cellulose, polyvinyl methyl ether, polyethylene oxide, polyvinyl pyrrolidone, polyethyl oxazolines or starch or cellulose esters, for example the acetates with a degree of substitution of less than 2.5.

A binder composition according to the invention may contain, for example, additives which enable the adhesive properties of an adhesive produced from a binder composition according to the invention to be modified. Such additives are, for example, the so-called tackifier resins which may be divided into natural resins and synthetic resins. Suitable tackifier resins are, for example, alkyd resins, epoxy resins, melamine resins, phenolic resins, urethane resins, hydrocarbon resins and natural resins, such as rosin, wood turpentine oil and tall oil. Suitable synthetic hydrocarbon resins are, for example, ketone resins, coumarone-indene resins, isocyanate resins and terpene/phenol resins. Synthetic resins are preferably used for the purposes of the invention.

Suitable flame retardants are, for example, typical phosphorus-containing compounds, more particularly elemental phosphorus, phosphates or phosphonates, for example triethyl phosphate or trichloropropyl phosphate. Compounds such as these can also have plasticizing and viscosity-adjusting properties. Other suitable flame retardants are, for example, diphenylcresyl phosphates, triphenyl phosphate, dimethyl methane phosphonate and the like. In addition, chloroparaffins may also be used as flame retardants. Halogenated polyester or polyether polyols, for example commercially available brominated polyether polyol, are also suitable. These halogenated polyester and polyether polyols may be incorporated, for example, in the polymers present in the binder according to the invention or in the binder composition according to the invention.

The cell regulators typically used are silicone-based compounds. In a preferred embodiment of the invention, crosslinkable liquid polybutadiene, silicone oils or paraffin oils in particular are used as the cell regulator. In a preferred embodiment of the present invention, commercially available silicone stabilizers are used as the stabilizers.

In order to increase the storage stability of the binders according to the invention or the binder composition according to the invention, it can be useful to add reactive silanes. Suitable reactive silanes are, for example, tetramethoxysilane, tetraethoxysilane, trimethoxy methyl silane or trimethoxy vinyl silane which are capable of trapping water. The content of such compounds in a binder according to the invention or in a binder composition according to the invention is less than 3% by weight, based on the polymer content of the binder or binder composition.

A binder according to the invention or a binder composition according to the invention may optionally contain a catalyst or a mixture of two or more catalysts in order to promote crosslinking. Suitable catalysts are, in particular, amine compounds, for example triethylenediamine, trimethyl aminoethyl piperazine, pentamethyl diethylenetriamine, tetramethylimino-bis-isopropylamine and bis-(dimethylaminopropyl)-N-isopropanolamine and dimorpholinodiethylether. Other suitable catalysts are those based on organic or inorganic heavy metal compounds such as, for example, cobalt naphthenate, dibutyl tin dilaurate, tin mercaptides, tin dichloride, zirconium tetraoctoate, antimony dioctoate, lead dioctoate, metal, more particularly iron, acetylacetonate. Any of the known catalysts for accelerating the condensation of silanols may be used with particular effect. Examples of such catalysts are organotin, organotitanium, organozirconium or organoaluminium compounds. Examples of such compounds are dibutyl tin dilaurate, dibutyl tin dimaleate, tin octoate, isopropyl triisostearoyl titanate, isopropyl tris-(dioctylpyrophosphate)-titanate, bis-(dioctylpyrophosphate)-oxyacetate titanate, tetrabutyl zirconate, tetrakis-(acetylacetonato)-zirconium, tetraisobutyl zirconate, butoxy tris-(acetylacetonato)-zirconium, tris-(ethylacetoacetato)-aluminium. Particularly suitable are dibutyl tin alkyl esters, such as dibutyl tin alkyl maleates or dibutyl tin laurates, more particularly dibutyl tin bis-ethyl maleate, dibutyl tin bis-butyl maleate, dibutyl tin bis-octyl maleate, dibutyl tin bis-oleyl maleate, dibutyl tin bis-acetyl acetate, dibutyl tin diacetate, dibutyl tin dioctoate, dibutyl tin oxide, dibutyl tin bis-triethoxysilicate and catalytically active derivatives thereof. The catalysts mentioned may be used individually or in the form of a mixture of two or more of the catalysts mentioned.

Other suitable catalysts are amino compounds containing an alkoxysilyl group, for example 3-aminopropyl trimethoxysilane.

The catalysts already described in this specification in connection with the production of the polyurethanes are also suitable catalysts.

The binders and binder compositions according to the invention are particularly suitable for the production of foams. Accordingly, the present invention also relates to a foam-generating composition at least containing a binder according to the invention or a binder composition according to the invention or a binder produced by a process according to the invention or a binder composition produced by a process according to the invention and a propellant.

Where the binders or binder compositions according to the invention are to be used for the generation of foams, they are preferably supplied to the user in pressurized containers (aerosol cans). To dispense the binders or binder compositions according to the invention from the aerosol cans, a foam-generating composition according to the invention contains at least one propellant in addition to the corresponding binders or binder compositions according to the invention. Suitable propellants are, for example, low-boiling fluorocarbons, hydrocarbons and/or ethers. The fluorocarbons R124, R125, R134a, R142b, R143 and R152a, R227 and the pure hydrocarbons propane, butane and isobutane and dimethylether are particularly preferred. In addition, $CO_2$, $N_2O$ or $N_2$ may be present as propellants. Combinations of these gases may be used. In the case of pressurized container formulations, propellant gas contents of 5 to 40% by weight and more particularly 5 to 20% by weight, based on the prepolymer mixture as a whole, are preferred. The content of gases which cannot be condensed under the prevailing pressure conditions should be gauged in such a way that the volume, based on the empty space of the pressurized container, produces a pressure of about 8 to 10 bar according to the relevant national standard for pressurized containers (aerosol cans). Since no $CO_2$ is released during the crosslinking reaction, sufficient propellant gas must be present both for dispensing and for foaming.

The foam-generating composition according to the invention is suitable, for example, for the production of a polymer foam.

Accordingly, the present invention also relates to a polymer foam obtainable using a binder according to the invention or a binder composition according to the invention or a binder produced by a process according to the invention or a binder composition produced by a process according to the invention.

The foams according to the invention may be present, for example, as one-component or two-component foams.

The foam yield may optionally be increased, for example, by adding silanes to the binder according to the invention. These silanes react and then crosslink under the effect of moisture with evolution of hydrogen.

The binders and binder compositions according to the invention are also suitable for the production of surface coating compositions, more particularly for the production of paints or adhesives. Accordingly, the present invention also relates to a surface coating composition, more particularly a paint or an adhesive, producible using a binder according to the invention or a binder composition according to the invention or a binder produced by a process according to the invention or a binder composition produced by a process according to the invention.

The present invention also relates to the use of a binder according to the invention or a binder composition according to the invention or a binder produced by a process according to the invention or a binder composition produced by a process according to the invention as an additive in surface coating compositions, foams or adhesives.

The invention is illustrated by the following Examples.

EXAMPLES

Example 1

Preparation of a Graft Polymer Containing Alkoxysilyl Groups 151 g of a polypropylene glycol (OH value 16) grafted with styrene/acrylonitrile in a ratio of 95:5 were weighed into a three-necked flask with 0.11 g of dibutyl tin dilaurate and heated with continuous stirring under nitrogen to a temperature of 80° C. 7.9 g of 2,4-toluene diisocyanate (TDI) were then added, resulting in an increase in temperature to 100° C. The mixture was then stirred for about 1 hour at 95° C. The NCO content was 0.9%. 22 g of 3,4,5,6-tetrabromophthalic acid-2-(2-hydroxyethoxy)-ethyl-2-hydroxypropyl ester (OH value 220) were then stirred into the NCO prepolymer. The reaction mixture was then stirred for 2 hours at 90° C. Finally, 11.6 g of 3-isocyanatopropyl trimethoxysilane were added to the reaction mixture which was then stirred for another 2 hours at 100° C.

A highly viscous polymer was obtained. The polymer was mixed with 2% of a stabilizer (OS50, Bayer) and 0.3% Neostann U220 (dibutyl tin diacetyl tin acetonate, Kaneka) and foamed. A rigid elastic foam was formed.

Example 2

Preparation of a Graft Polymer Containing Alkoxysilyl Groups 1,400 g of a methylstyrene/acrylonitrile-grafted polypropylene glycol (OH 20) were weighed with 0.35 g of dibutyl tin dilaurate into a three-necked flask and heated to 70° C. 117 g of 3-isocyanatopropyl trimethoxysilane were then added, followed by stirring for another hour.

A white viscous liquid was obtained.

Example 3

Production of a Film 0.25% by weight of dibutyl tin diacetonate was added to a part of the product of Example 2. A 2 mm thick film was cast from the mixture obtained. Curing took place over 24 hours. After storage for 14 days, the film obtained had a tensile strength of 2.07 N/mn² and a breaking elongation of 200%.

Example 4

Production of a Foam

In addition, the polymer containing alkoxysilyl groups prepared in accordance with Example 2 was processed to a foam. To this end, 81.6% by weight of the polymer were mixed with 3.0% by weight of PC-Stab EP 19 (Nitriol), 0.3% by weight of Neostan U 220, 1.0% by weight of Baysilonöl M 100 (Bayer) and 15% by weight of a mixture of propane and butane and foamed. The skin forming time of the foam obtained was about 10 minutes and the cure time about 1 hour. The foam density was about 50 g/l. The cured foam was rigid and elastic.

In another foaming test, 2% by weight of vinyl trimethoxysilane was added in addition to the constituents mentioned above. The foam obtained had identical properties but its adhesion to porous substrates, stone or concrete was distinctly improved.

Example 5

Production of a Foam 58.8 g of a polypropylene glycol (OH value 56) were mixed with 41.2 g of a polyvinyl acetate homopolymer[1] ($M_n$>1,000,000) to form a homogeneous paste. 0.8 g of dibutyl tin dilaurate, 1.0 g of dibutyl tin diacetyl acetonate, 0.15 g of Baysilonöl M 100 (silicone oil, a product of Bayer AG), 1.0 g of pyrogenic silica, 4.0 g of Tegostab B1048 (a product of Goldschmidt) and 14.0 g of isocyanatopropyl trimethoxysilane were then successively stirred in. The mixture obtained was mixed with 17.5 g of a mixture of propane and butane in an aerosol can and dispensed. The rigid, elastic foam formed after dispensing had a skin forming time of 20 minutes and a cure time of about 6 hours.

[1]: Specification:

Grading Curve (Normal Sieve):
  0.4 mm max. 5%
  0.2 mm 5–15%
  0.1 mm 50–70%
  0.1 mm max. 35%

Bulk density: 400–700 g/l (DIN/ISO 697)
Ash: max. 1% 2 h, 1,000° C.

We claim:

1. A foam-generating composition comprising a propellant and a binder that comprises: a graft polymer bearing at least two alkoxysilyl groups of the formula:

$$-Si(R_1)_m(OR_2)_{3-m} \quad (I)$$

in which $R_1$ is a linear or branched alkyl group containing 1 to 6 carbon atoms, $R_2$ is a linear or branched alkyl group containing 1 to 6 carbon atoms and m is an integer of 0 to 2, having graft branches on a graft base, the graft polymer containing at least 0.5% by weight, based on the graft base, of graft branches, wherein the graft polymer is obtained by reaction of a graft base or graft polymer bearing at least two reactive functional groups X with an alkoxysilane compound of the formula:

$$Y-R_3Si(R_1)_m(OR_2)_{3-m} \quad (II)$$

in which $R_1$, $R_2$, and m are as defined in the formula (I), $R_3$ is a linear or branched alkyl group containing 2 to 24 carbon atoms, an optionally alkyl-substituted cycloalkyl group containing 4 to 24 carbon atoms, an optionally substituted aralkyl group containing 6 to 24 carbon atoms, an alkoxy group containing 2 to 10 carbon atoms, a polyoxyalkylene group containing 4 to 44 carbon atoms or an optionally alkyl-substituted aryl group containing 6 to 24 carbon atoms, and Y is at least one functional group which can react with the functional group X to form a covalent bond or Y and $R^3$ together represent hydrogen, and wherein the graft polymer comprises at least one polymer selected from the group consisting of polyesters, polyethers, polyether esters, polyamides, polyurethanes, polycarbonates, polyacrylates, polymethacrylates, and polyvinyl esters.

2. The foam-generating composition as claimed in claim 1, wherein the graft polymer is obtained by reaction of the graft base with a mixture of two or more olefinically unsaturated monomers under radical conditions, at least one of the olefinically unsaturated monomers containing an alkoxysilyl group of the formula:

$$-Si(R_1)_m(OR_2)_{3-m} \quad (I)$$

in which $R_1$ is a linear or branched alkyl group containing 1 to 6 carbon atoms, $R_2$ is a linear or branched alkyl group containing 1 to 6 carbon atoms and m is an integer of 0 to 2.

3. The foam-generating composition as claimed in claim 1, wherein the graft base contains at least two functional groups X, independently selected from the group consisting of OH, SH, $NH_2$, $NHR_4$, COOH, epoxy, NCO, anhydride and vinyl groups, wherein $R_4$ is a member selected from the group consisting of linear or branched alkyl groups containing 1 to 24 carbon atoms, aralkyl groups containing 6 to 24 carbon atoms, aryl groups containing 6 to 24 carbon atoms, S-containing heteroaryl groups and N-containing heteroaryl groups.

4. The foam-generating composition as claimed in claim 1 wherein the graft polymer bearing alkoxysilyl groups has a molecular weight $M_n$ of at least 2,000 g/mol.

5. A surface coating composition comprising the foam-generating composition claimed in claim 1.

6. A member selected from the group consisting of surface coating compositions, foams and adhesives comprising the foam-generating composition of claim 1.

7. The foam-generating composition as claimed in claim 1, wherein the graft polymer contains at least two functional groups X, independently selected from the group consisting of OH, SH, $NH_2$, $NHR_4$, COOH, epoxy, NCO, anhydride and vinyl groups, wherein $R_4$ is a member selected from the group consisting of linear or branched alkyl groups containing 1 to 24 carbon atoms, aralkyl groups containing 6 to 24 carbon atoms, aryl groups containing 6 to 24 carbon atoms, S-containing heteroaryl groups and N-containing heteroaryl groups.

8. The foam-generating composition as claimed in claim 1 wherein the graft polymer bearing alkoxysilyl groups has a molecular weight $M_n$ of at least 2,000 g/mol.

9. A member selected from the group consisting of surface coating compositions, foams and adhesives comprising the foam-generating composition of claim 1.

10. The foam-generating composition of claim 1 containing more than 10% by weight of graft branches based in the weight of the graft base.

11. A foam-generating binder composition comprising a propellant and:
a) a polymer bearing alkoxysilyl groups obtained by
a1) reaction of a polymer containing at least two reactive functional groups X with an alkoxysilane compound of the formula:

in which $R_1$ is a linear or branched alkyl group containing 1 to 6 carbon atoms, $R_2$ is a linear or branched alkyl group containing 1 to 6 carbon atoms, $R_3$ is a linear or branched alkyl group containing 2 to 24 carbon atoms, an optionally alkyl-substituted cycloalkyl group containing 4 to 24 carbon atoms, an optionally substituted aralkyl group containing 6 to 24 carbon atoms, an alkoxy group containing 2 to 10 carbon atoms, a polyoxyalkylene group containing 4 to 44 carbon atoms or an optionally alkyl-substituted aryl group containing 6 to 24 carbon atoms, m is an integer of 0 to 2 and Y is at least one functional group which can react with the functional group X to form a covalent bond or Y and $R^3$ together represent hydrogen; or by
a2) radical or ionic polymerization of a mixture of at least two monomers containing at least one olefinically unsaturated double bond, at least one olefinically unsaturated monomer containing at least one alkoxysilyl group of the formula:

in which $R_1$ is a linear or branched alkyl group containing 1 to 6 carbon atoms, $R_2$ is a linear or branched alkyl group containing 1 to 6 carbon atoms and m is an integer of 0 to 2,
or a mixture of two or more such polymers, and
b) at least one other polymer with or without an alkoxysilyl group which has a softening point of 30° C. to 250° C. (as measured by the ring and ball method),
wherein the polymer bearing alkoxysilyl groups comprises at least one polymer selected from the group consisting of polyesters, polyethers, polyether esters, polyamides, polyurethanes, polycarbonates, polyacrylates, polymathacrylates, and polyvinyl esters.

12. The binder composition as claimed in claim 11, wherein the polymer contains as functional groups X at least two functional groups independently selected from the group consisting of OH, SE, $NH_2$, $NHR_4$, COOR, epoxy, NCO, anhydride or vinyl groups, where $R_4$ is a linear or branched alkyl group containing 1 to 24 carbon atoms, an aralkyl group containing 6 to 24 carbon atoms an aryl group containing 6 to 24 carbon atoms, an S-containing heteroaryl group or an N-containing heteroaryl group.

13. The binder composition as claimed in claim 11 containing at least one polymer with a softening point of at least 30° C. as a further polymer.

14. A process for the production of the binder composition claimed in claim 11 which comprises at least one of the following process stages:
(i) a polymer containing at least two reactive functional groups X is reacted with an alkoxysilane compound of the formula:

in which $R_1$, $R_2$, $R_3$, m and Y are as defined above, to form a covalent bond between the residue of X and Y or the residue of X and Si and the reaction product is then mixed with at least one polymer obtained by radical polymerization of at least one monomer containing at least one olefinically unsaturated double bond, a mixture of two or more such monomers or a mixture of two or more such polymers;
(ii) a polymer containing at least two reactive functional groups x is mixed with at least one polymer selected from the group of polymers obtained by radical polymerization of at least one member selected from the group consisting of monomers containing at least one olefinically unsaturated double bond, a mixture of two or more such monomers and a mixture of two or more such polymers and then with an alkoxysilane compound of the formula:

in which $R_1$, $R_2$, $R_3$, m and Y are as defined above, to form a covalent bond between the residues of X and Y or the residues of X and Si;
(iii) at least one radical polymerization of a monomer containing at least one olefinically unsaturated double bond or a mixture of two or more such monomers to form a polymer is carried out in the presence of at least one polymer containing two reactive functional groups X and the mixture of polymers is then reacted with an alkoxysilane compound of the formula:

in which $R_1$, $R_2$, $R_3$, m and Y are as defined above, to form a covalent bond between the residues of X and Y or the residues of X and Si; and
(iv) at least one radical polymerization of a monomer containing at least one olefinically unsaturated double bond or a mixture of two or more such monomers to form a polymer is carried out in the presence of at least one reaction product of a polymer containing at least two reactive functional groups X with an alkoxysilane compound corresponding to general formula II:

in which $R_1$, $R_2$, $R_3$, m and Y are as defined above, to form a covalent bond between the residues of X and Y or the residues of X and Si.

15. A polymer foam obtained by foaming a binder that comprises: a graft polymer bearing at least two alkoxysilyl groups of the formula:

in which $R_1$ is a linear or branched alkyl group containing 1 to 6 carbon atoms, $R_2$ is a linear or branched alkyl group containing 1 to 6 carbon atoms and m is an integer of 0 to 2, having graft branches on a graft base, the graft polymer containing at least 0.5% by weight, based on the graft base, of graft branches, wherein the graft polymer comprises at least one polymer selected from the group consisting of polyesters, polyethers, polyether esters, polyamides, polyurethanes, polycarbonates, polyacrylates, polymethacrylates, and polyvinyl esters.

* * * * *

UNITED STATES PATENT AND TRADEMARK OFFICE
CERTIFICATE OF CORRECTION

PATENT NO. : 7,067,563 B2  
APPLICATION NO. : 10/332797  
DATED : June 27, 2006  
INVENTOR(S) : Marc S. Zimmer Page 1 of 1

It is certified that error appears in the above-identified patent and that said Letters Patent is hereby corrected as shown below:

Column 28  
Line 1, delete "COOR" and insert therefor --COOR--.  
Line 27, delete "x" and insert therefor --X--.

Signed and Sealed this

Thirty-first Day of October, 2006

JON W. DUDAS  
*Director of the United States Patent and Trademark Office*